Nov. 3, 1953 — G. R. ADZIMA — 2,657,941
BICYCLE KICK STAND CONSTRUCTION
Filed Nov. 26, 1952
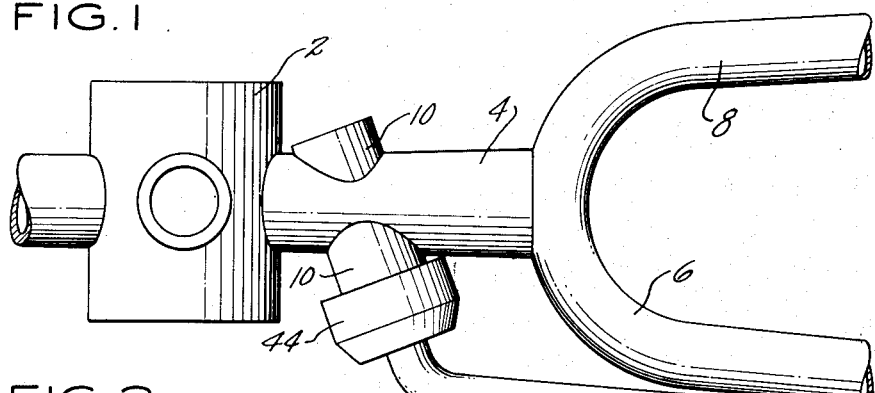
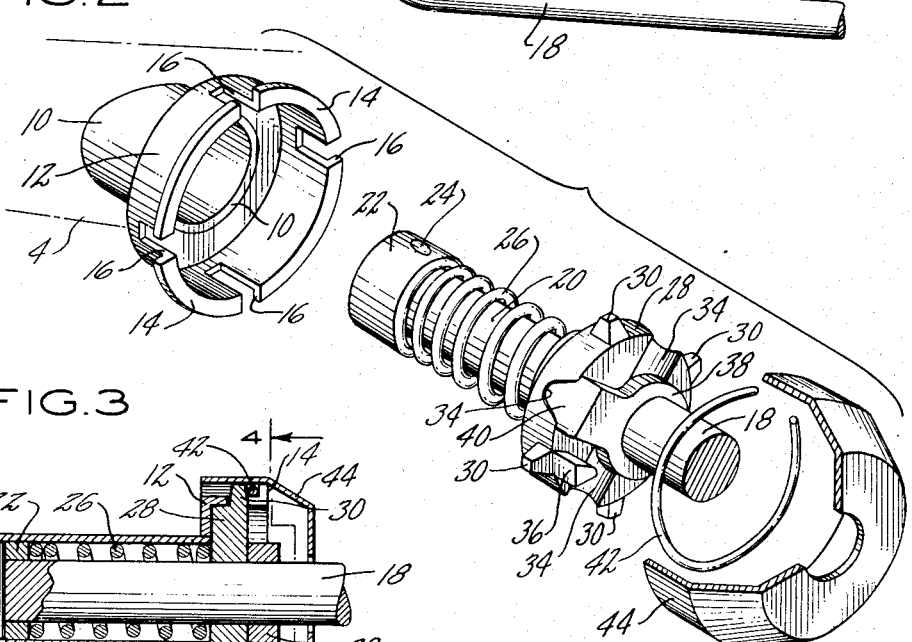
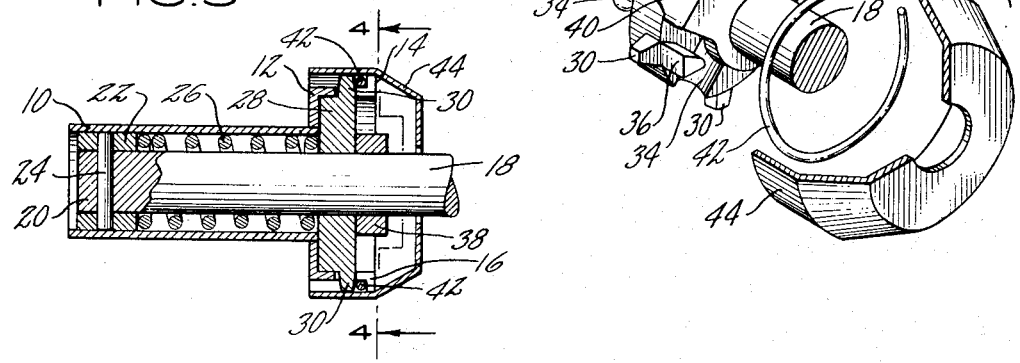
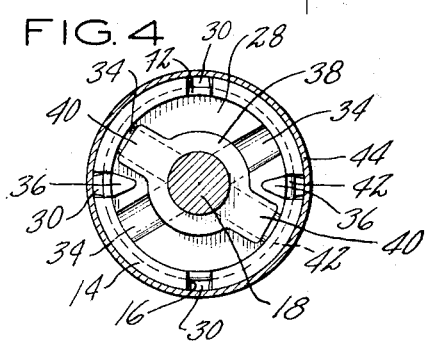
INVENTOR
GEORGE R. ADZIMA
BY *Chapin and Neal*
ATTORNEYS Patented Nov. 3, 1953

2,657,941

UNITED STATES PATENT OFFICE 2,657,941

BICYCLE KICK STAND CONSTRUCTION

George R. Adzima, Westfield, Mass., assignor to The Westfield Manufacturing Company, Westfield, Mass., a corporation of Massachusetts Application November 26, 1952, Serial No. 322,779

2 Claims. (Cl. 280—301)

This invention relates to an improved construction for a bicycle kick stand of the type providing a bent leg prop for supporting the bicycle in standing position when left unattended.

An object of the invention is to provide a prop with a unitary cartridge type of sub-assembly for the moving parts of the device which may be inserted in and removed from the housing in which the same are mounted on the bicycle. The invention is designed to facilitate the manufacture and assembly of this type of device particularly when the housing therefor is an integral part of the bicycle frame construction. A further object is the provision for a sub-assembly easily handled for repair and replacement of parts in the field.

These and other specific objects and advantages of the new form of kick stand assembly will be apparent from the following description of an embodiment of the invention as shown by the accompanying drawings in which:

Fig. 1 is a top plan of the housing and prop of the stand as related to the frame of the bicycle;

Fig. 2 is an exploded view in perspective showing the housing tube socket and sub-assembly of operative parts in position for mounting therein;

Fig. 3 is a longitudinal section of the unit as assembled in the housing; and

Fig. 4 is a view on line 4—4 of Fig. 3.

The device of the present invention is particularly designed to improve the construction and operation of the kick stand device disclosed in Patent No. 2,434,423, dated January 13, 1948, on an invention of Harold F. Maschin. The improved construction will be readily appreciated from its comparison with the prior device and the accomplishment of the above objects.

The invention is characterized by the operative mechanism of the positional cam structure being entirely supported on the trunnion for the stand prop with the entire assembly being as a unit removably secured in the housing therefor by a snap ring. Accordingly, the action of the device may be tested for proper operation before assembly on the bicycle, be easily assembled with a minimum of effort, and removed from inspection and testing outside of its housing so as to determine the cause of any failure in the proper operation thereof.

With reference to Fig. 1 of the drawings pertinent bicycle frame structure is illustrated by a usual crank hanger 2, a rearwardly extending end frame tube 4, and branched rear forks 6 and 8.

A cylindrical housing 10 of hollow tubular form is shown integral with the rear frame tube 4 in axial intersecting relation therewith. The housing is horizontally disposed with an elongated section 10 and a short enlarged cup-shaped cam receiving socket section (Figs. 2 and 3). The outer edges of section 12 are provided with an outwardly flanged lip or rim 14 between spaced keyway slots 16 cut in the free edge of the enlargement parallel with the axis of the housing. The housing is adapted to support the leg 18 of the kick stand prop and receive the bent trunnion 20 thereof in telescopic relation.

Referring more particularly to Fig. 3 the trunnion 20 has at its outer free end a bearing collar 22 fixed thereto as by a pin 24. Seated against the collar 22 and surrounding the stem of the trunnion is a coiled spring 26 bearing at its other end against a cam member 28.

The cam 28 is in the form of disc slidably and rotatably mounted on stem 20, the peripheral edge of the disc having spaced radially extending integral keys or lugs 30. On the bearing face of the cam are provided two pairs of angularly related diametrically aligned positional pin receiving grooves 34 between which at opposite ends thereof are located projecting stop posts 36.

The cam member 28 is held by the spring 26 against a cam pin member 38, fixed integrally as by brazing or welding on the stem 20. Member 38 has diametrically opposed cam pins 40 adapted for seating in the grooves 34. Selective engagement in one of the pair of grooves 34 determines the position of the prop leg which may be vertically disposed in operative position or horizontally disposed parallel with the frame tubes 4 and 6 (Fig. 1) for storage position in the usual manner.

It will be seen from Figs. 2 and 3 that a cartridge type of trunnion sub-assembly is provided for insertion as a unit in the socket of the housing tube 10 and cup 12. The bore of tube 10 is of uniform diameter throughout its length and slidably receives at its outer end the bearing collar 22 for rotation therein. Cam member 28 is seated with the lugs 30 registering with and received in the slots 16. Member 28 is thus held against rotation and forms a bearing for rotation of the stem 20.

As shown most clearly by Fig. 3, the lugs 30 are of a lesser dimension axially of the tube 10 and cup 12 than the axial length of slots 16 inwardly of the flanged rim 14. The lugs also extend beyond the outer surface of the cup 12. Thus a wire snap ring 42 may be removably fitted over the rim 14 of the cup and held between the rim and the lugs 30. This not only locks member 28 against rotation but also locks the entire sub-assembly in operative position for manipulation of the leg 18 of the prop. A cover or dome 44 is provided to cap the open end of the cup and prevent the entrance of dirt. Collar 22 serves as a plug for the opposite end of the tube.

In Fig. 4 the member 38 is located with the cam pins 40 in one pair of grooves 34. The trunnion may thus be turned clockwise to change the position of the leg and the pin 40 snapped into position in the other pair of grooves. Stops 36 prevent counterclockwise movement from the position of Fig. 4 and clockwise movement beyond registration with said other pair of grooves. Turning movement is resisted by the spring 26 constantly urging the stem 20 to the left as in Fig. 2 or Fig. 3. Pressure is exerted against collar 22 and directly against the cam member 28.

Having described my invention, I claim:

1. In a kick stand assembly for bicycles comprising a tubular housing fixed integrally on the frame of the bicycle and provided with a short cup-shaped enlargement at one end forming a cam receiving socket; said housing having the inner bore of the elongated tubular section thereof of unobstructed uniform diameter throughout its length with the web portion of the cup-shaped enlargement extending from the outer edge of said tubular section, said enlargement being provided with an open ended axially extending slot with the outer end edge of said enlargement having an outwardly extending flanged rim, in combination with a bent leg prop having a trunnion angularly extending therefrom provided with a cartridge type sub-assembly for insertion in said housing and including a cam pin fixed to the trunnion adjacent its inner end, a cam member slidably and rotatably mounted on the trunnion adjacent said pin with the surface opposed to said pin formed with angularly related positional pin receiving grooves, a spring surrounding said trunnion and urging said cam member against said pin, a bushing fixed to said trunnion adjacent the free end thereof and holding said spring under compression against the cam member to removably seat said pin in one of said grooves, said cam member having a radially extending lug for keyed engagement in said axial slot of the cup-shaped enlargement to hold the member against rotation therein, said engaged lug being spaced from said flanged rim and extending beyond the outer surface of said enlargement, and a snap ring embracing the enlargement between said lug and rim for holding said assembly against removal.

2. In a kick stand assembly for bicycles comprising a tubular housing fixed integrally on the frame of the bicycle and provided with a short cup-shaped enlargement at one end forming a cam receiving socket; said housing having the inner bore of the elongated tubular section thereof of unobstructed uniform diameter throughout its length with the web portion of the cup-shaped enlargement extending from the outer edge of said tubular section, the sides of said enlargement being provided with spaced open ended axially extending slots and the outer end edges of said sides between said slots formed with an outwardly extending flanged rim, in combination with a bent leg prop having a trunnion angularly extending therefrom provided with a cartridge type sub-assembly for insertion in said housing and including a pair of diametrically opposed cam pins fixed to the trunnion adjacent its inner end, a cam member in the form of a disc slidably and rotatably mounted on the trunnion adjacent said pins with the surface thereof opposed to said pins provided with pairs of angularly related diametrically aligned positional pin receiving grooves, a coiled spring surrounding said trunnion and seated against said cam member, a bushing collar fixed to the outer end of said trunnion providing a seat for the other end of said spring and holding said spring under compression to press said cam member against said pins, said cam member having spaced radially extending lugs for registration with said axial slots of the tubular housing enlargement and extending beyond the outer surface thereof, the dimension of said lugs axially of the trunnion being less than the length of said slots inwardly of said flanged rim, and a split spring wire retaining ring adapted to removably embrace said enlargement adjacent said flanged rim and between said rim and said radial lugs received in said axial slots.

GEORGE R. ADZIMA.

References Cited in the file of this patent
UNITED STATES PATENTS

| Number | Name | Date |
|---|---|---|
| 1,847,395 | Hickman | Mar. 1, 1932 |
| 2,434,423 | Maschin | Jan. 13, 1948 |